(12) United States Patent
Biskeborn et al.

(10) Patent No.: US 11,676,626 B1
(45) Date of Patent: Jun. 13, 2023

(54) TAPE HEAD HAVING JOINED MODULES

(71) Applicant: Western Digital Technologies, Inc., San Jose, CA (US)

(72) Inventors: Robert G. Biskeborn, Hollister, CA (US); Oscar J. Ruiz, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/692,889

(22) Filed: Mar. 11, 2022

(51) Int. Cl.
*G11B 5/127* (2006.01)

(52) U.S. Cl.
CPC ................................. *G11B 5/127* (2013.01)

(58) Field of Classification Search
None
See application file for complete search history.

(56) References Cited

U.S. PATENT DOCUMENTS

| | | | |
|---|---|---|---|
| 3,573,769 A * | 4/1971 | Flora .................... | G11B 5/4893 |
| 4,685,005 A | 8/1987 | Fields, Jr. | |
| 5,436,780 A * | 7/1995 | Nagata ................. | G11B 5/3103 360/122 |
| 6,122,147 A * | 9/2000 | Fahimi .................... | G11B 5/60 |
| 6,433,959 B1 * | 8/2002 | Lakshmikumaran .... | G11B 5/10 |
| 6,570,738 B1 | 5/2003 | McKinstry | |
| 6,690,542 B1 * | 2/2004 | Wang ................... | G11B 5/3103 |
| 7,167,339 B2 | 1/2007 | Biskeborn et al. | |
| 7,171,740 B2 | 2/2007 | Biskeborn | |
| 7,602,579 B2 | 10/2009 | Biskeborn et al. | |
| 7,894,161 B2 | 2/2011 | Biskeborn | |
| 8,542,460 B2 | 9/2013 | Biskeborn et al. | |
| 9,305,580 B2 | 4/2016 | Cherubini et al. | |
| 9,721,601 B2 | 8/2017 | Biskeborn et al. | |
| 2005/0254170 A1 | 11/2005 | Dugas et al. | |

(Continued)

FOREIGN PATENT DOCUMENTS

| | | |
|---|---|---|
| EP | 0492848 A2 | 7/1992 |
| WO | 2001075874 A2 | 10/2001 |

OTHER PUBLICATIONS

Kahwaty, VN et al., "Wafer Design Techniques for Same-Gap-Servo Head", IBM, Mar. 31, 2005, pp. 1-2, <https://priorart.ip.com/IPCOM/000117067/Wafer-Design-Techniques-for-Same-Gap-Servo-Head>.

(Continued)

*Primary Examiner* — William J Klimowicz
(74) *Attorney, Agent, or Firm* — Patterson + Sheridan, LLP; Steven H. VerSteeg

(57) ABSTRACT

The present disclosure is generally related to a tape head comprising a first module and a second module joined together along a seam. The first module comprises a plurality of data heads disposed in a first row parallel to the seam, and the second module comprises a plurality of data heads disposed in a second row parallel to the first row. The first row and the second row are spaced apart a distance of about 50 μm to about 175 μm. A via is disposed at a media facing surface (MFS) along a portion of the seam. The via has a length less than a width of the MFS and equal to or greater than a length of the first and second rows of data heads. The via is configured to create a vacuum effect to pull a magnetic media against the media facing surface when the tape head reads and writes data to the magnetic media.

23 Claims, 12 Drawing Sheets

(56) References Cited

U.S. PATENT DOCUMENTS

| | | |
|---|---|---|
| 2007/0133130 A1* | 6/2007 | Biskeborn ............ G11B 5/3912 |
| | | 360/323 |
| 2008/0212232 A1 | 9/2008 | Biskeborn |
| 2009/0185314 A1* | 7/2009 | Hachisuka ........... G11B 5/3967 |
| | | 360/314 |
| 2009/0207524 A1 | 8/2009 | Koeppe |
| 2009/0310248 A1* | 12/2009 | Hachisuka ............. G11B 5/314 |
| | | 360/77.01 |
| 2016/0111120 A1* | 4/2016 | Engelen ............... G11B 5/1871 |
| | | 360/231 |
| 2018/0277152 A1* | 9/2018 | Biskeborn .............. G11B 5/295 |

OTHER PUBLICATIONS

Biskeborn, Robert G. et al., "Head and Interface for High Areal Density Tape Recording", IEEE Transaction on Magnetics, Nov. 2012, <https://www.researchgate.net/publication/260572505_Head_and_Interface_for_High_Areal_Density_Tape_Recording>.

Shimizu, Osamu et al., "The Role of Tape Technology in Managing the Exponential Growth of Cold Data", Data Storage Innovation Conference, Jun. 13-15, 2016, pp. 1-40, <https://www.snia.org/sites/default/files/DSI/2016/presentations/Osamu_Shimizu_Role_of_Tape_Technology_rev.pdf>.

* cited by examiner

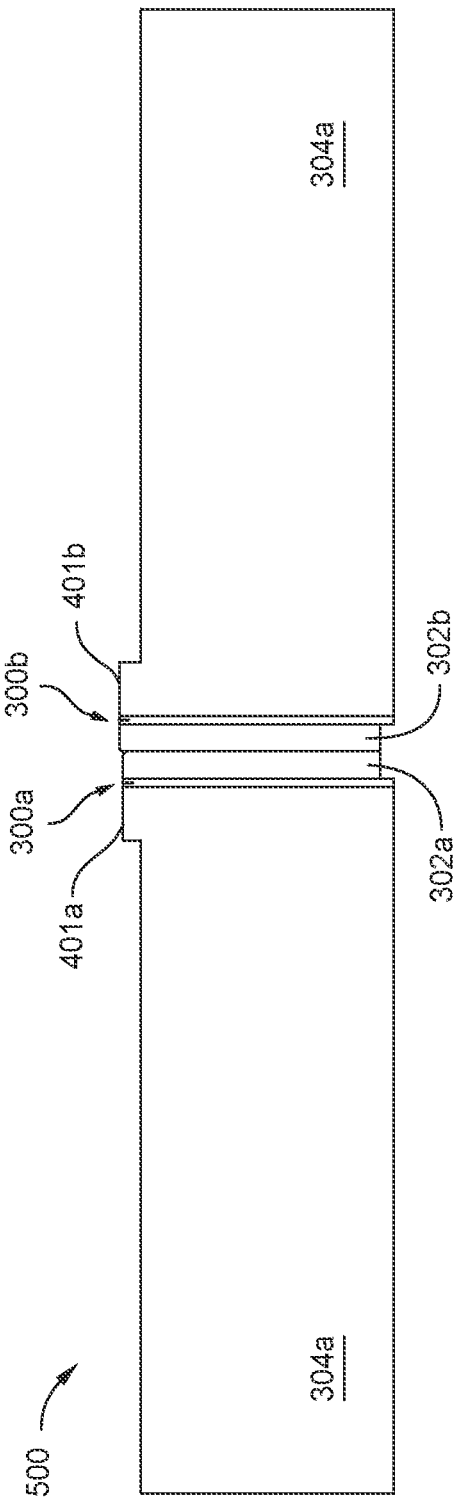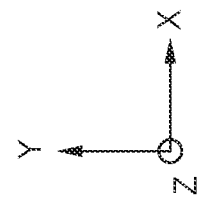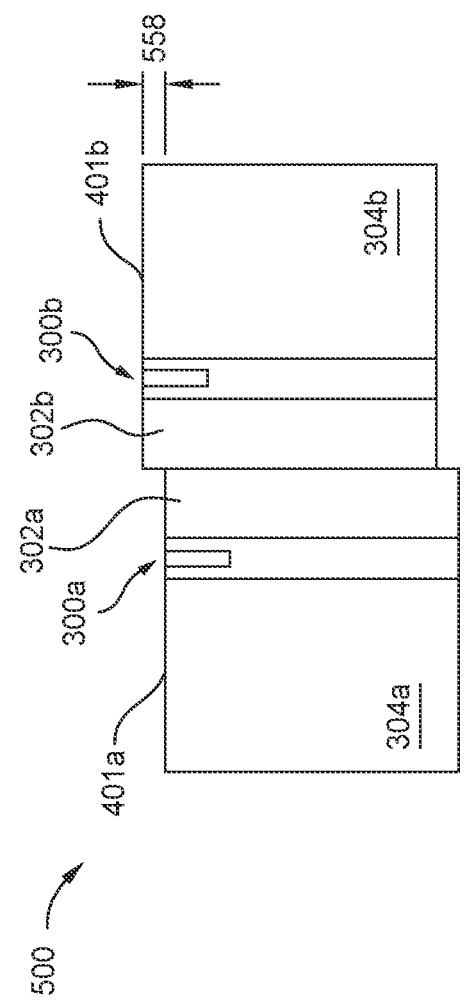
FIG. 5A
FIG. 5B

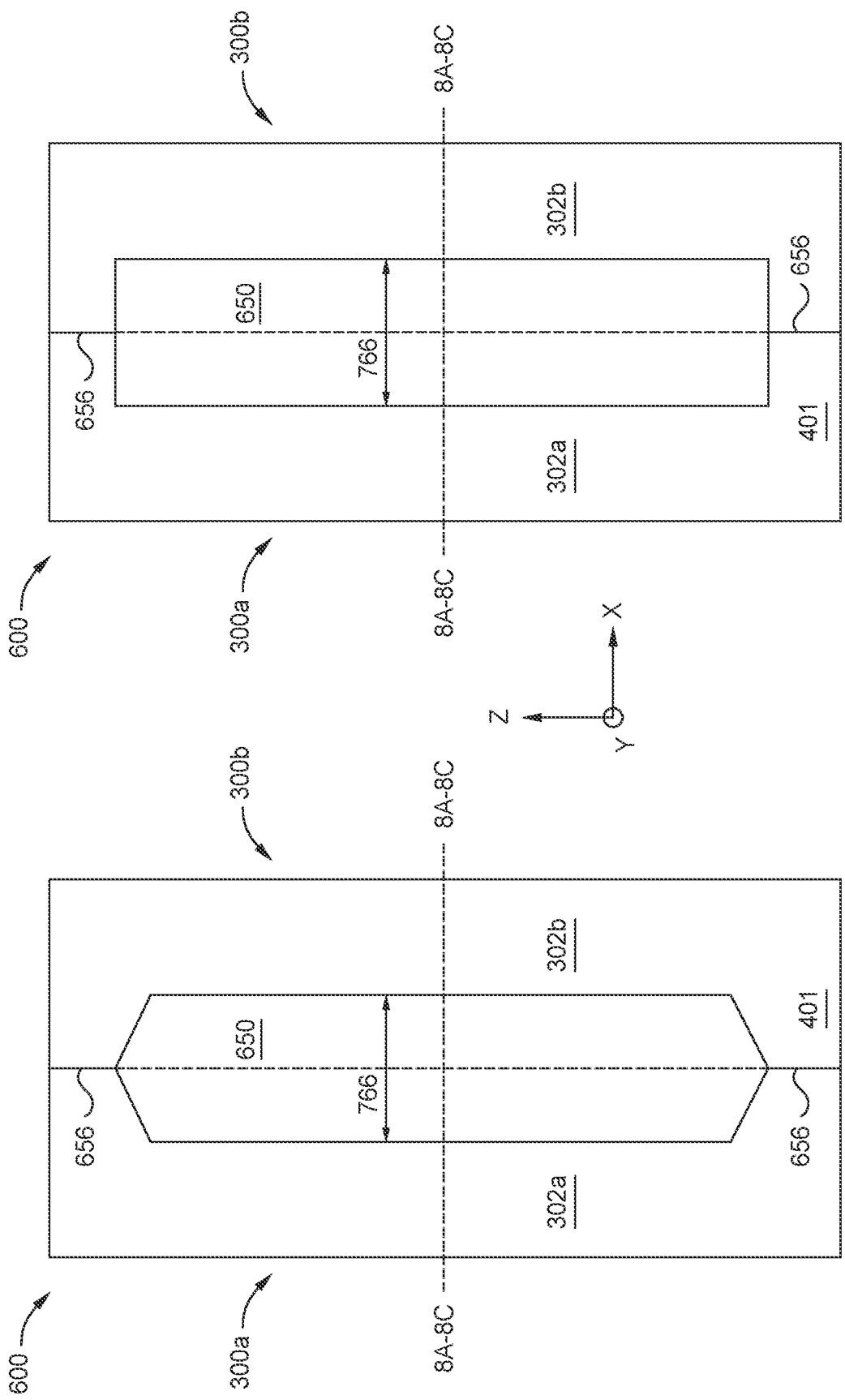

TAPE HEAD HAVING JOINED MODULES

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time, referred to as tape dimensional stability (TDS) effects, due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape drive capable of compensating for tape dimensional stability effects.

SUMMARY OF THE DISCLOSURE

The present disclosure is generally related to a tape head comprising a first module and a second module joined together along a seam. The first module comprises a plurality of data heads disposed in a first row parallel to the seam, and the second module comprises a plurality of data heads disposed in a second row parallel to the first row. The first row and the second row are spaced apart a distance of about 50 µm to about 175 µm. A via is disposed at a media facing surface (MFS) along a portion of the seam. The via has a length less than a width of the MFS and equal to or greater than a length of the first and second rows of data heads. The via is configured to create a vacuum effect to pull a magnetic media against the media facing surface when the tape head reads and writes data to the magnetic media.

In one embodiment, a tape head comprises a first module comprising: a first closure and a plurality of first data heads and one or more first servo heads aligned in a first row at a media facing surface adjacent to the first closure, and a second module comprising: a second closure and a plurality of second data heads and one or more second servo heads aligned in a second row at the media facing surface adjacent to the second closure, the second row being parallel to and aligned with the first row. The first closure and the second closure are joined together along a seam, the seam being parallel to the first and second rows, and a via is disposed along a portion of the seam, the via having a length greater than or equal to a length of the first row.

In another embodiment, a tape head comprises a first module comprising: a first closure and a plurality of first data heads and one or more first servo heads aligned in a first row at a media facing surface adjacent to the first closure, and a second module comprising: a second closure and a plurality of second data heads and one or more second servo heads aligned in a second row at the media facing surface adjacent to the second closure, the second row being parallel to and aligned with the first row, wherein the first closure and the second closure are joined together along a seam, the seam being disposed between and parallel to the first and second rows. The tape head further comprises a via disposed along a portion of the seam, the via having a length less than a length of the seam, wherein the via is configured to create a vacuum effect to pull a magnetic media against the media facing surface when the tape head reads and writes data to the magnetic media.

In yet another embodiment, a tape head comprises a first module comprising: a first closure and a first row of first data heads disposed at a media facing surface adjacent to the first closure, the first row of first data heads comprising a plurality of first write heads, a plurality of first read heads, and one or more first servo heads, and a second module comprising: a second closure and a second row of second data heads disposed at the media facing surface adjacent to the second closure, the second row of second data heads comprising a plurality of second write heads, a plurality of second read heads, and one or more second servo heads, the second row being parallel to and aligned with the first row. The first row and the second row are spaced apart a distance of about 50 µm to about 175 µm, the first closure and the second closure are joined together along a seam, and the seam is disposed between and parallel to the first and second rows. The tape head further comprises a via disposed along a portion of the seam, the via having a length greater than or equal to a length of the first row and less than a length of the seam, wherein the via has a depth of about 0.2 µm to about 5.0 µm and a width of about 40 µm to about 250 µm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5B illustrate a tape head comprising two modules that are joined together without a via, according to one embodiment.

FIGS. 7A-7B illustrate MFS views of the via of the tape head of FIGS. 6A-6C, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape head comprising a first module and a second module joined together along a seam. The first module comprises a plurality of data heads disposed in a first row parallel to the seam, and the second module comprises a plurality of data heads disposed in a second row parallel to the first row. The first row and the second row are spaced apart a distance of about 50 μm to about 175 μm. A via is disposed at a media facing surface (MFS) along a portion of the seam. The via has a length less than a width of the MFS and equal to or greater than a length of the first and second rows of data heads. The via is configured to create a vacuum effect to pull a magnetic media against the media facing surface when the tape head reads and writes data to the magnetic media.

Figure 1A:
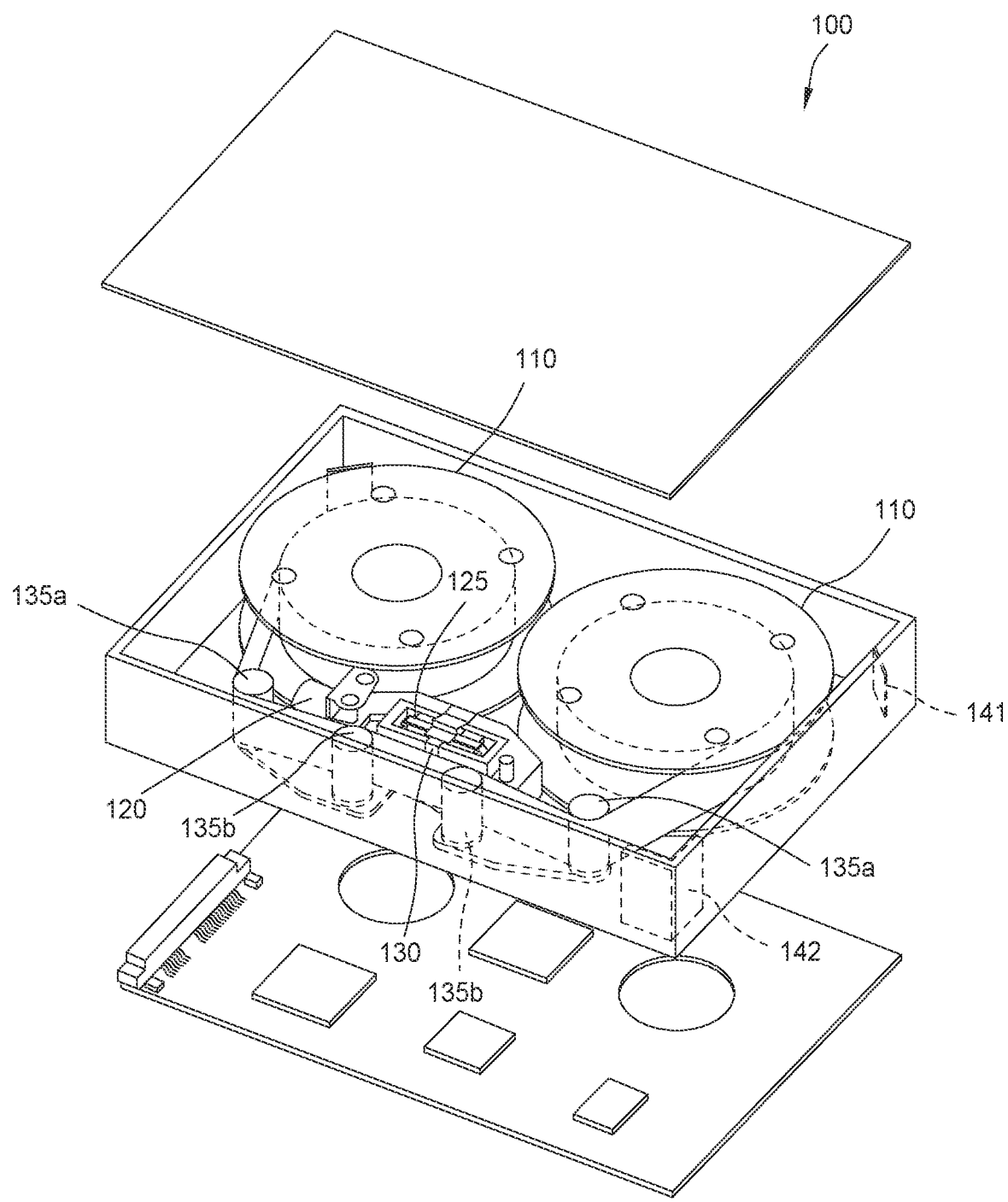
FIGS. 1A-1C illustrate a perspective exploded view, a simplified top down, and side profile view of a tape drive, in accordance with some embodiments.
Figure 1B:
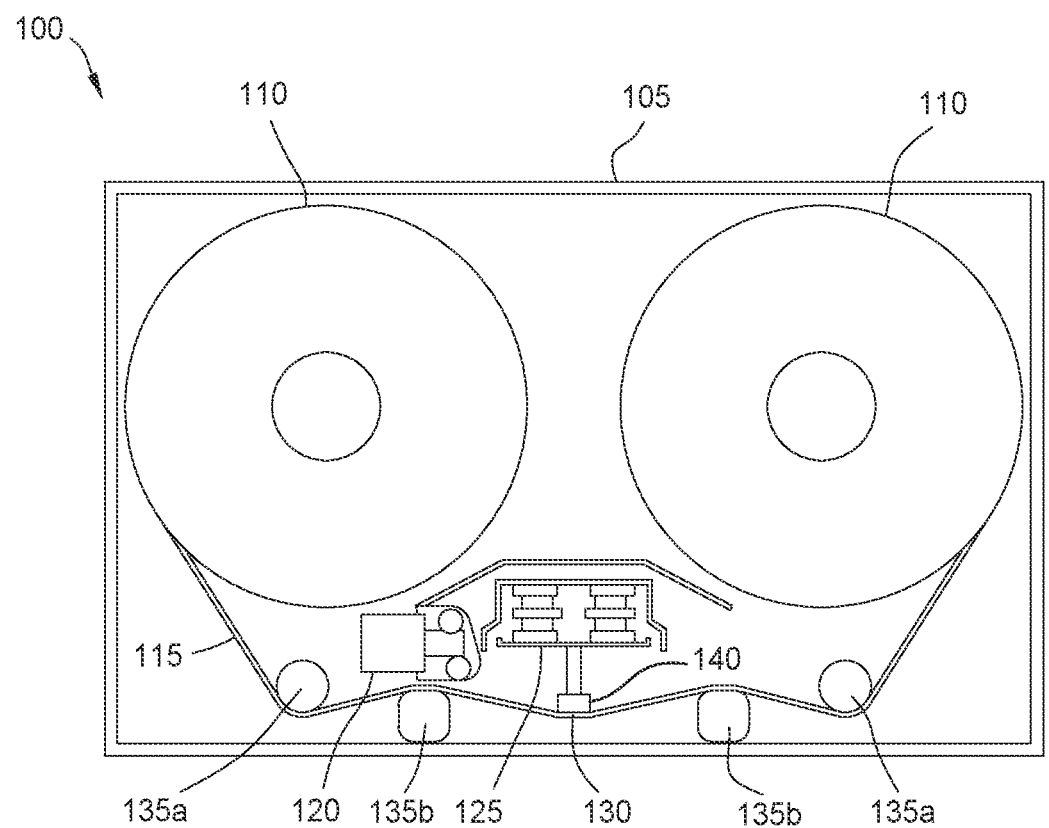
Figure 1C:
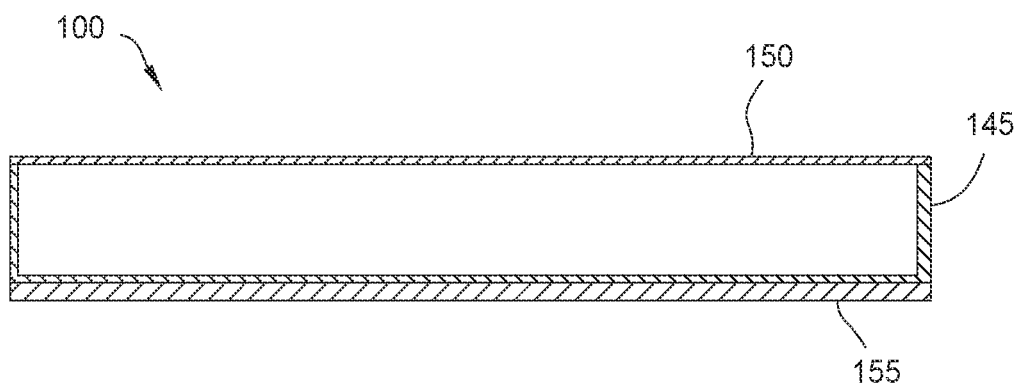

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
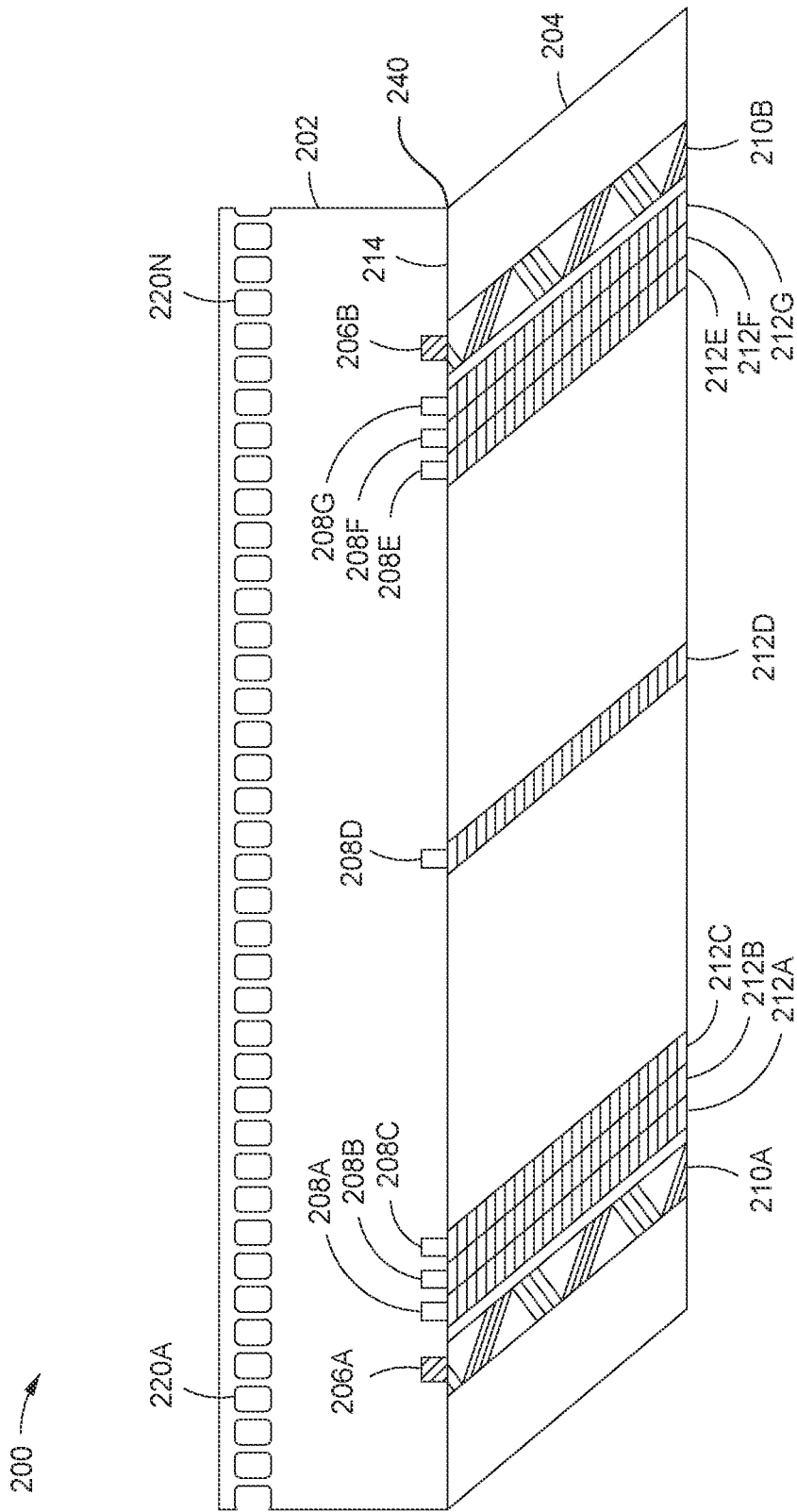
FIG. 2 is a schematic illustration of a tape head and tape that are aligned.

FIG. 2 is a schematic illustration of a portion of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller 240, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head module 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
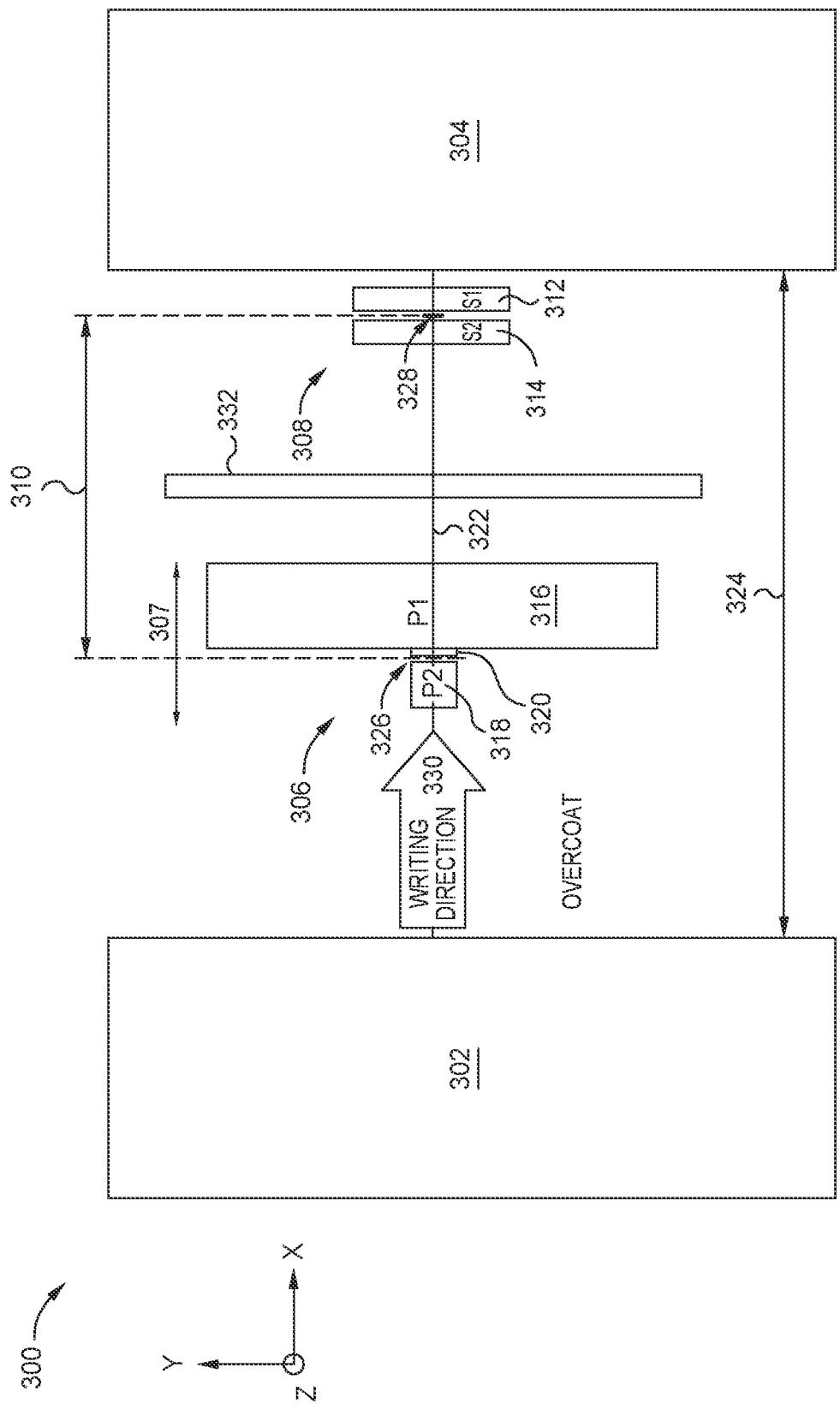
FIGS. 3A-3B illustrate a media facing surface (MFS) view of same gap verify (SGV) modules, according to various embodiments.
Figure 3B:
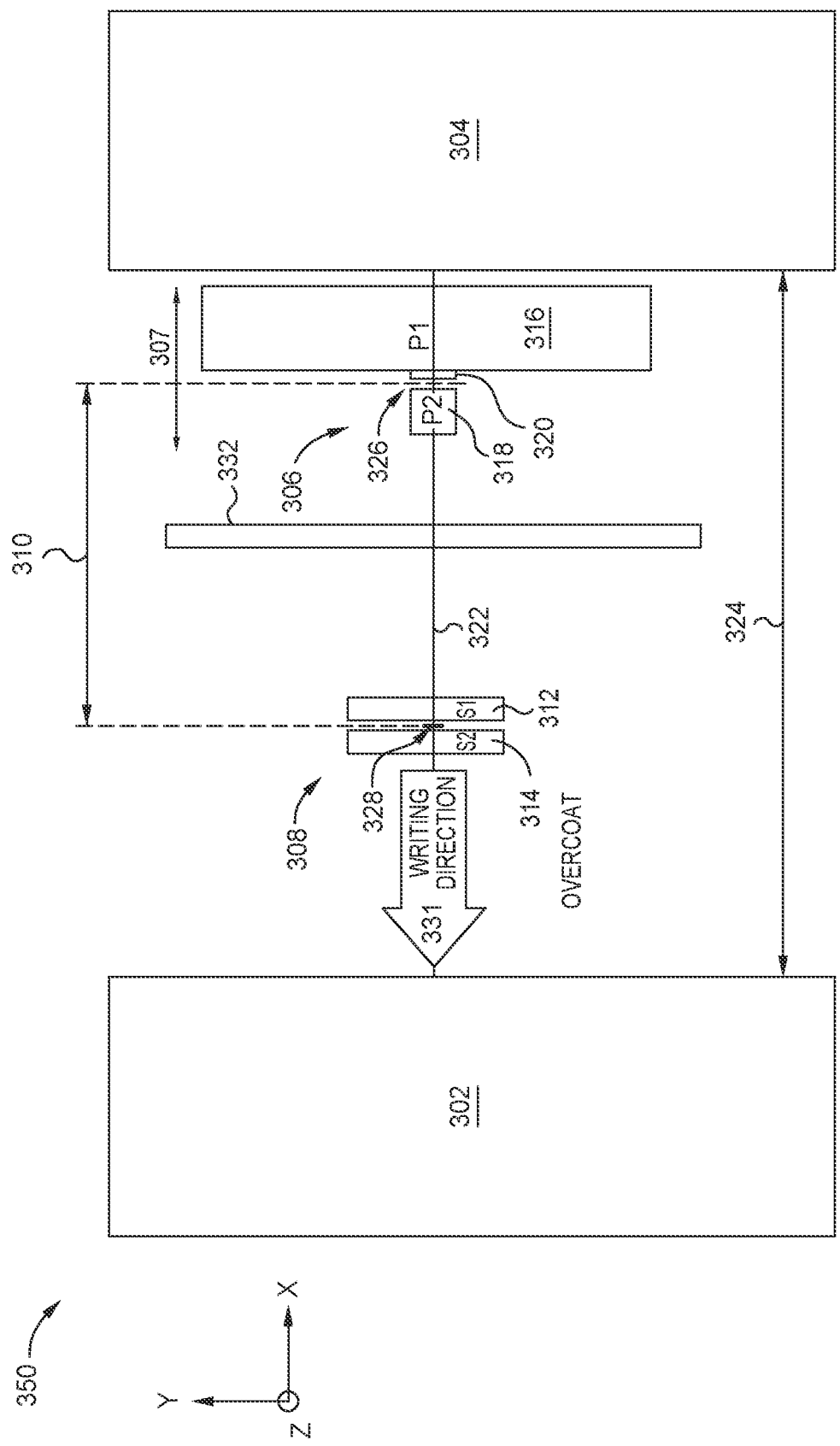

FIGS. 3A-3B illustrate a media facing surface (MFS) view of same gap verify (SGV) modules 300, 350, respectively, according to various embodiments. The SGV modules 300, 350 may be utilized within a tape drive comprising a controller, such as the TED or tape drive 100 of FIG. 1A. The SGV modules 300, 350 may be the tape head module 200 of FIG. 2.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, the SGV modules 300, 350 each comprises a head array of 32 writers 306 and 32 readers 308, forming 32 writer 306 and reader 308 pairs, along with one or more servo readers (not shown). In each of the SGV modules 300, 350, each writer 306 a width 307 in the x-direction of about 5 μm to about 10 μm.

In each of the SGV modules 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield 332 is disposed between the writer 306 and the reader 308 of each pair to reduce cross-talk signals to the reader 308 from the writer 306. The shield 332 may comprise permalloy and may be combined with Ir for wear resistance, for example.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the x-direction such that the center axis 322 is aligned with a centerline of the write gap 326 and a centerline of the magnetic sensor 328. In embodiments in which the SGV module 300 is actively tilted, such as for compensating TDS, the writer 306 and the reader 308 may be offset relative to the center axis. In some embodiments, the distance 310 is measured from the write gap 326 to an MgO layer (not shown) of the magnetic sensor 328.

In the SGV module 300 of FIG. 3A, when writing data to a tape or other media, the tape moves over the writer 306 in the writing direction 330 (e.g., in the x-direction). In the SGV module 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the shield 332 may be used to further reduce magnetic cross-talk between the writer 306 and the reader 308. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
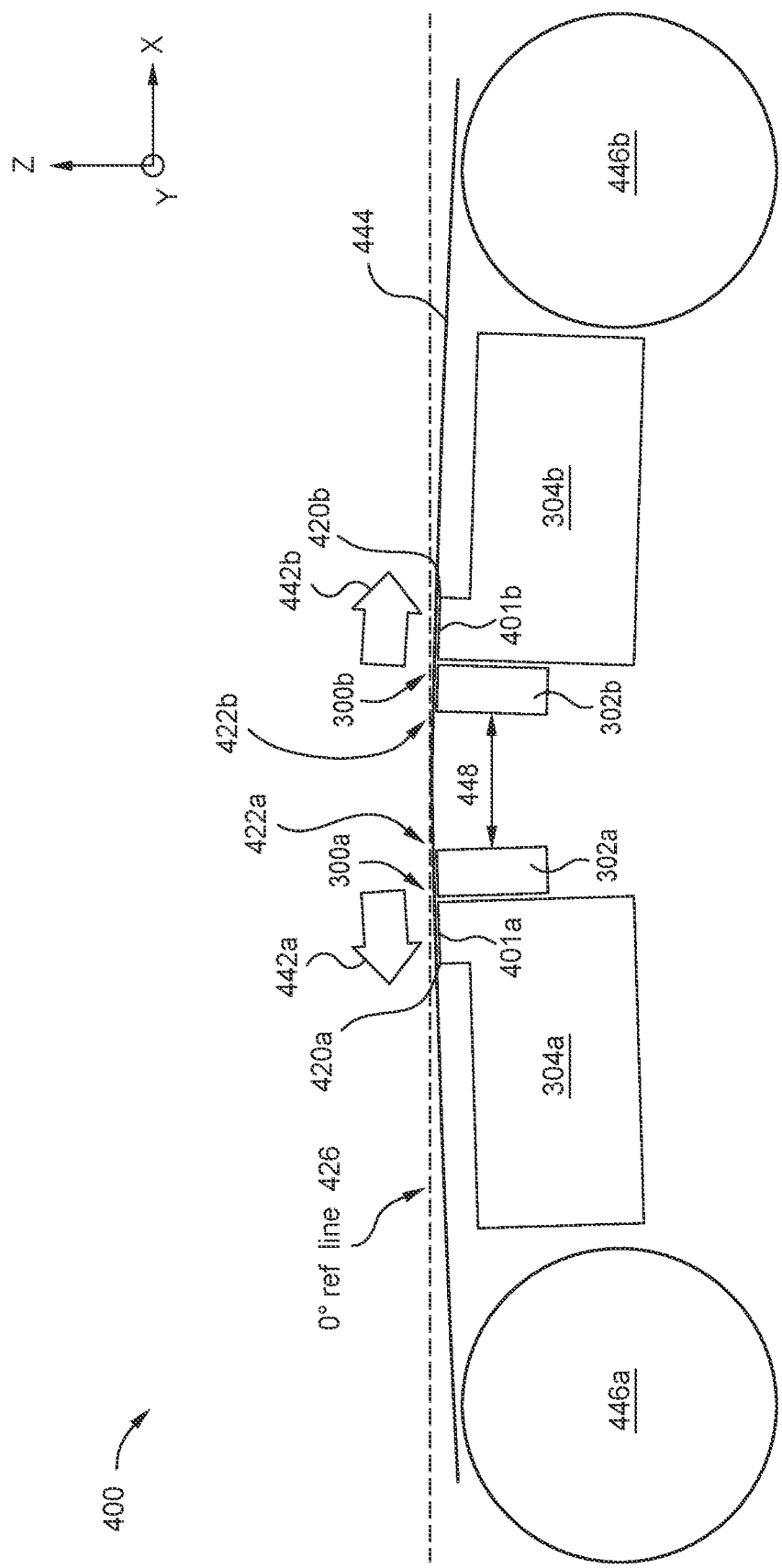
FIG. 4 illustrates a side view of a tape head comprising two SGV modules, according to one embodiment.

FIG. 4 illustrates a side view of a tape head 400 comprising two SGV modules 300a, 300b that are spaced apart, according to one embodiment. The tape head 400 comprises a first SGV module 300a and a second SGV module 300b. Each SGV module 300a, 300b may be the SGV module 300 or 350 shown in FIG. 3A or FIG. 3B, respectively. In some embodiments, the read and write transducers 308, 306 in the first and second SGV modules 300a, 300b may be aligned, to example, to operate in a legacy mode where one SGV module (e.g., the first SGV module 300a) writes data and the other SGV module (e.g., the second SGV module 300b) reads the data written by the first SGV module 300a. The tape head 400 illustrates a SGV tape head 400 where the tape 444 contacts both the MFS 401a of the first SGV module 300a and the MFS 401b of the second SGV module 300b simultaneously in both directions the tape 444 moves.

In one embodiment, the first SGV module 300a comprises a first closure 302a, one or more first writers 306 (shown in FIG. 3A) disposed adjacent to the first closure 302a, one or more first readers 308 (shown in FIG. 3A) disposed adjacent to the one or more first writers 306, and a first substrate 304a disposed adjacent to the one or more first readers 308. Similarly, in such an embodiment, the second SGV module 300b comprises a second closure 302b, one or more second writers 306 (shown in FIG. 3A) disposed adjacent to the second closure 302b, one or more second readers 308 (shown in FIG. 3A) disposed adjacent to the one or more second writers 306, and a second substrate 304b disposed adjacent to the one or more second readers 308. The first SGV module 300a has a first writing and reading direction 442a that is opposite to a second writing and reading direction 442b of the second SGV module 300b.

In one embodiment, the first SGV module 300a and the second SGV module 300b are arranged in a face-to-face configuration or arrangement such that the first closure 302a of the first SGV module 300a is disposed adjacent or proximate to the second closure 302b of the second SGV module 300b. In other words, the first SGV module 300a is a mirror image of the second SGV module 300b, the second SGV module 300b is a right hand module like that shown in FIG. 3A and the first SGV module 300a is a left hand module. The first SGV module 300a is spaced a distance 448 from the second SGV module 300b of about 100 μm to about 1000 μm.

In other embodiments, the first SGV module 300a and the second SGV module 300b are arranged in a substrate-to-substrate configuration or reversed configuration, where the first substrate 304a is disposed adjacent to the second substrate 304b, and tape 444 encounters or passes over either the first closure 302a or the second closure 302b prior to passing over either the first or second substrate 304a, 304b, respectively. In such a configuration where the first and second modules 300a, 300b are arranged like shown in FIG. 3A, the first module 300a has the second writing and reading direction 442b that is opposite to the first writing and reading direction 442a of the second SGV module 300b.

Referring to FIG. 4, which shows a SGV tape head 400, a MFS 401a, 401b of each of the first and second SGV modules 300a, 300b is configured to support a tape 444 or other magnetic media. The MFS 401a, 401b of each of the first and second SGV modules 300a, 300b includes surfaces of the writers 306 and the readers 308 of each SGV module 300a, 300b. The first SGV module 300a and the second SGV module 300b are both able to independently write and read verify data, like discussed above. The tape 444 may contact and wrap around a first substrate corner 420a (e.g., a first skiving edge) and a first closure corner 422a (e.g., a second skiving edge) of the first SGV module 300a, and contact and wrap around a second closure corner 422b (e.g., a third skiving edge) and a second substrate corner 420b (e.g., a fourth skiving edge) of the second SGV module 300b, resulting in the tape 444 being bent or angled downwards from a 0° reference line 426 (e.g., parallel to the x-axis). In such a configuration, the tape 444 contacts both the MFS 401a and the MFS 401b simultaneously in both directions the tape 444 moves.

FIG. 5A illustrates a side view of a tape head 500 comprising two modules 300a, 300b that are joined together without a via, according to one embodiment. FIG. 5B illustrates a schematic side view of the tape head 500 of FIG. 5A, according to one embodiment. The tape head 500 comprises a first module 300a and a second module 300b. Each module 300a, 300b may be the SGV module 300 or 350 shown in FIG. 3A or FIG. 3B, respectively. In some embodiments, the read and write transducers 308, 306 in the first and second modules 300a, 300b may be aligned, to example, to operate in a legacy mode where one module (e.g., the first module 300a) writes data and the other module (e.g., the second module 300b) reads the data written by the first module 300a.

In the tape head 500, the first closure 302a of the first module 300a is joined together with the second closure 302b of the second module 300b. Thus, comparing to the tape head 400 of FIG. 4, the first and second modules 300a, 300b are not spaced apart the distance 448 of about 100 μm to about 1000 μm. However, as shown in FIG. 5B, it can be difficult to accurately align the first and second closures 302a, 302b together such that the first MFS 401a and the second MFS 401b are aligned in the x-direction. As such, the first MFS 401a and the second MFS 401b may be offset a distance 558 in the y-direction of up to about 2 μm or more. Depending on which way a tape moves over the first and second modules 300a, 300b, the tape may fly over at least one of the first and/or second MFS 401a, 401b due to the offset distance 558 and air getting between the tape and the MFS 401a, 401b, which may prevent the first and/or second modules 300a, 300b from writing data to or reading data from the tape.

Figure 6A:
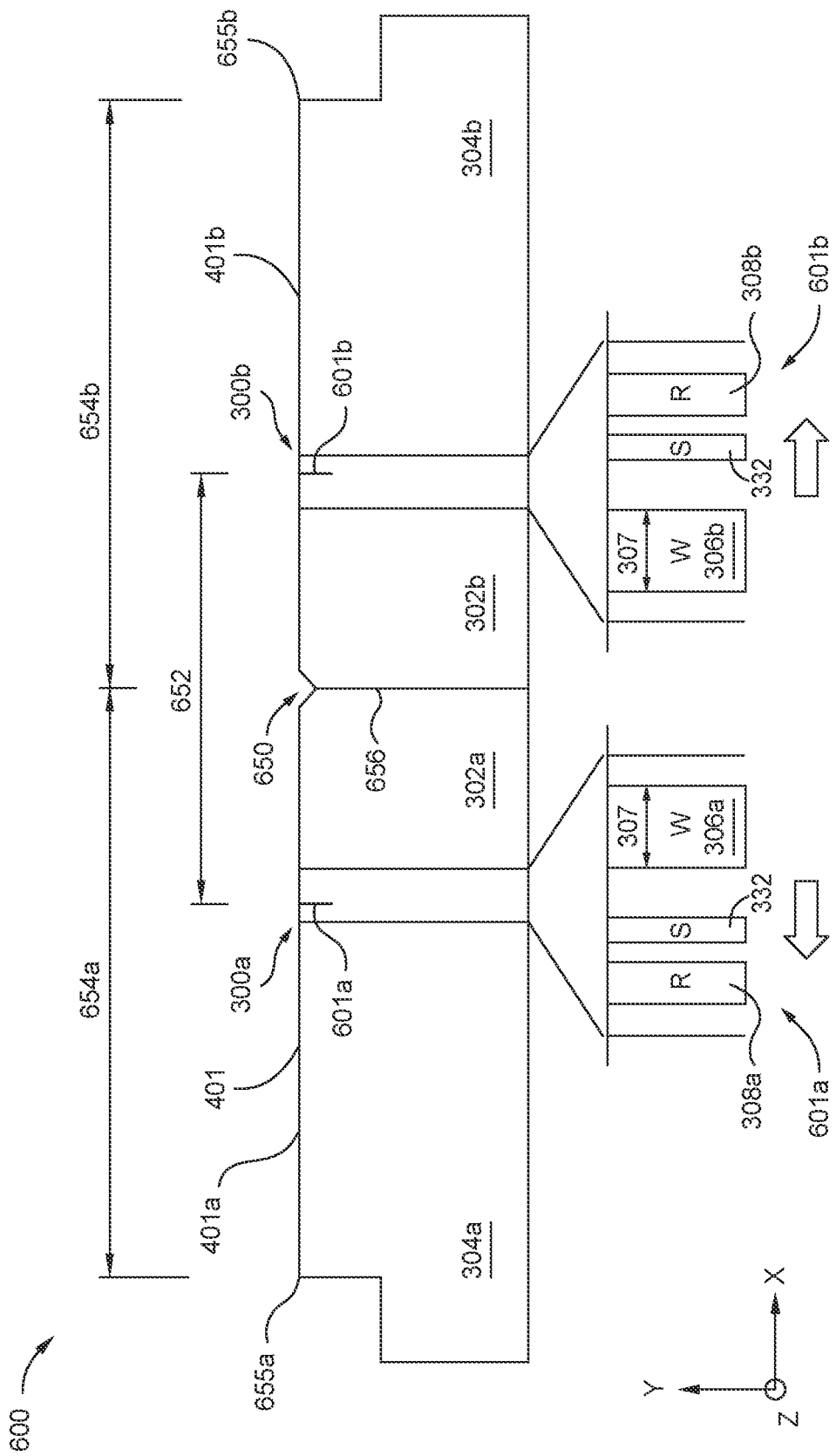
FIGS. 6A-6C illustrate a tape head comprising two modules that are joined together with a via, according to another embodiment.
Figure 6B:
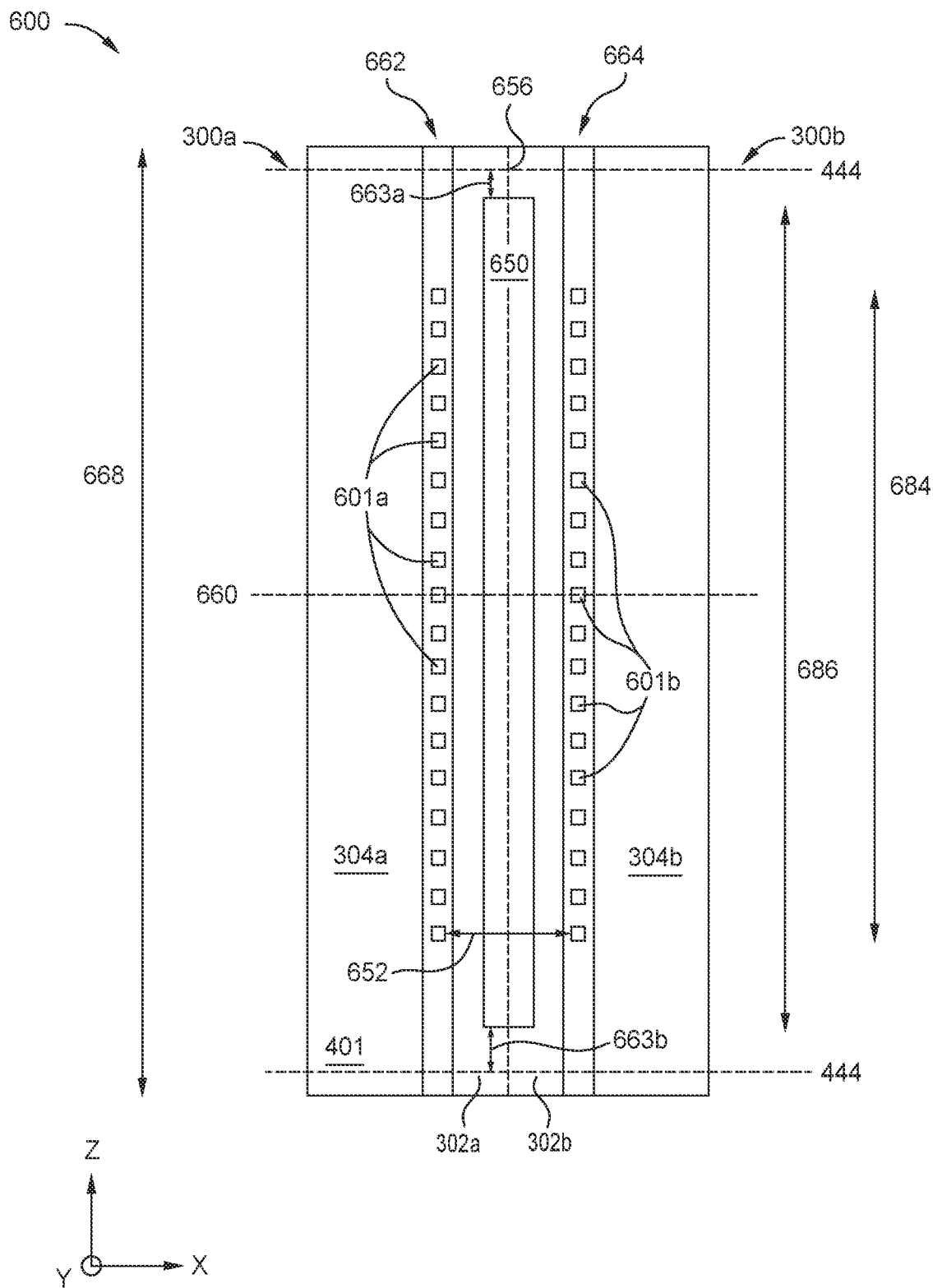
Figure 6C:
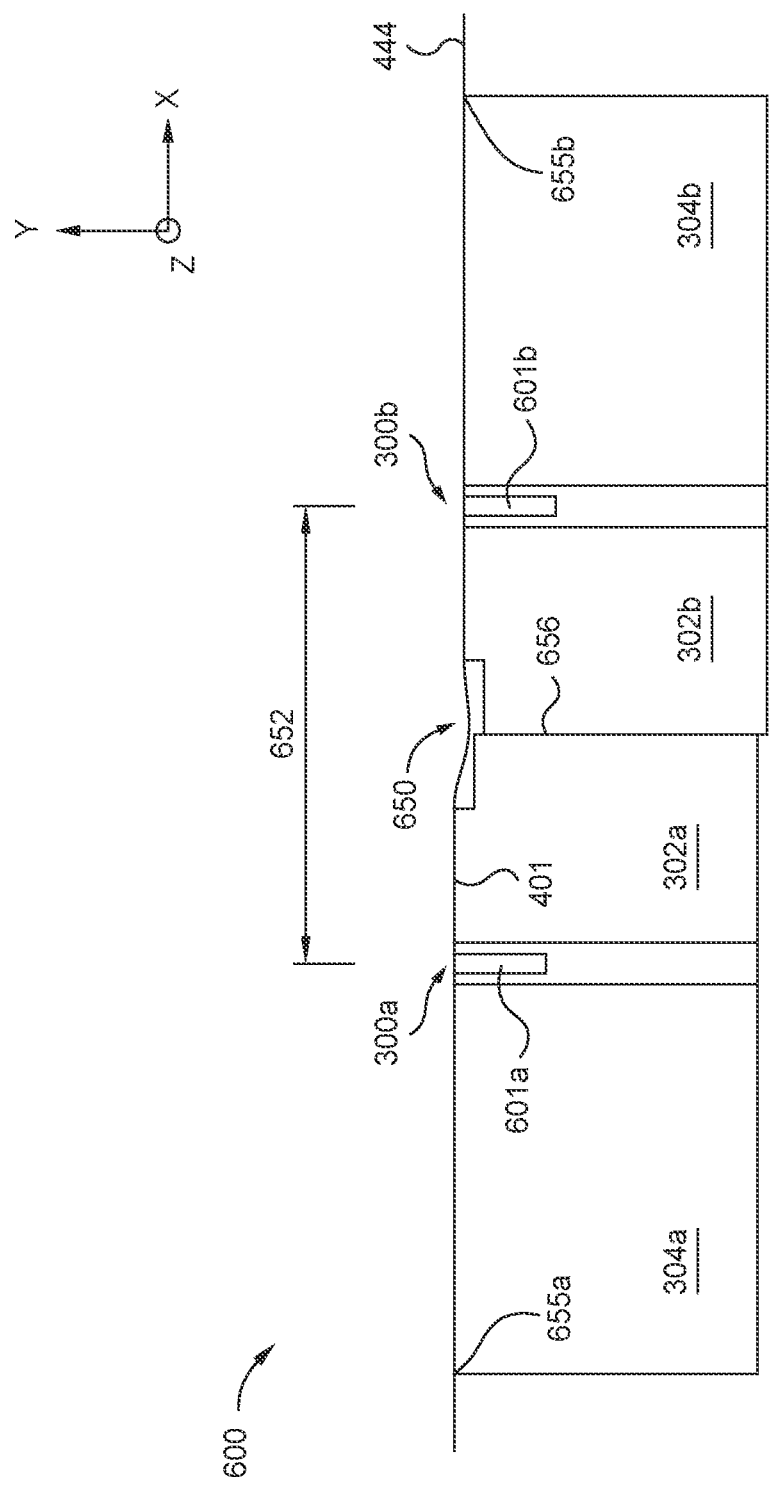

FIG. 6A illustrates a cross-sectional view of a tape head 600 comprising two modules 300a, 300b that are joined together with a via, according to another embodiment. FIG. 6B illustrates an MFS view of the tape head 600 of FIG. 6A, according to one embodiment. FIG. 6C illustrates a schematic cross-sectional view of the tape head 600 of FIGS. 6A-6B, according to one embodiment. FIGS. 6A and 6C illustrate cross-sectional views of the tape head 600 along the line 660 of FIG. 6B. FIGS. 7A-8B below expand upon further details regarding how the first and second modules 300a, 300b of FIGS. 6A-6C are joined together. As such, aspects of FIGS. 6A-8B may be used in combination with one another.

The tape head 600 comprises a first module 300a and a second module 300b. Each module 300a, 300b may be the SGV module 300 or 350 shown in FIG. 3A or FIG. 3B, respectively, each individually configured to write data to a tape and read verify the data. In some embodiments, the read and write transducers 308, 306 in the first and second modules 300a, 300b may be aligned, to example, to operate in a legacy mode where one module (e.g., the first module 300a) writes data and the other module (e.g., the second module 300b) reads the data written by the first module 300a.

The first module 300a comprises a plurality of first data heads 601a aligned in a first row 662, shown in FIG. 6B. Each first data head 601a comprises a write head 306a or write transducer and a read head 308a. Each first data head 601a may optionally comprise a shield 332 disposed between the write head 306a and the read head 308a. The write head 306a, the read head 308a, and the shield 332 may be the write head 306, the read head 308, and the shield 332 of FIG. 3A or 3B.

The second module 300b comprises a plurality of second data heads 601b aligned in a second row 664, shown in FIG. 6B. The first row 662 and the second row 664 are disposed parallel to one another and are aligned in the x-direction and the z-direction. In other words, the plurality of first data heads 601a are aligned in the x-direction and the z-direction with the plurality of second data heads 601b. The first and second rows 662, 664 have a same width 684 or span length in the z-direction. While 18 first and second data heads 601a, 601b are shown, both the first and second modules 300a, 300b may comprise any number of data heads 601a, 601b. Thus, the number of data heads 601a, 601b is not intended to be limiting. Moreover, one or more data heads 601a, 601b may comprise servo readers, such as the outer most data heads 601a, 601b in each row.

Each second data head 601b comprises a write head 306b or write transducer and a read head 308b. Each second data head 601b may optionally comprise a shield 332 disposed between the write head 306b and the read head 308b. The write head 306b, the read head 308b, and the shield 332 may be the write head 306, the read head 308, and the shield 332 of FIG. 3A or 3B. Moreover, while the first write head 306a and the second write head 306b are disposed adjacent to the first closure 302a and the second closure 302b, respectively, in FIG. 6A, the first write head 306a and the second write head 306b may instead be disposed adjacent to the first substrate 304a and the second substrate 304b, respectively. Each write head 306a, 306b of both the first and second modules 300a, 300b has a width 307 in the x-direction of about 5 µm to about 10 µm.

The first row 662 of first data heads 601a are spaced a distance 652 of about 50 µm to about 175 µm in the x-direction from the second row 664 of second data heads 601a. As such, the first data heads 601a and the second data heads 601b are disposed closer together than conventional tape heads, such as by a factor of about 7 or 9. Because the first and second data heads 601a, 601b are disposed closer together, the width 307 of the first and second write heads 306a, 306b is able to be reduced to about 5 µm to about 10 µm. The MFS 401a of the first module 300a has a length 654a in the x-direction of about 125 µm to about 175 µm, such as about 155 µm. The MFS 401b of the second module 300b has a length 654b in the x-direction of about 125 µm to about 175 µm, such as about 155 µm. The MFS 401a of the first module 300a and the MFS 401b of the second module 300b may form a substantially continuous or flat surface, and may be collectively referred to herein as the MFS 401.

In the tape head 600, the first closure 302a of the first module 300a is joined together with the second closure 302b of the second module 300b along a seam 656. The first and second modules 300a, 300b may be glued, bonded, or adhered together along the seam 656. Thus, comparing to the tape head 400 of FIG. 4, the first and second modules 300a, 300b are not spaced apart the distance 448 of about 100 µm to about 1000 µm. The MFS 401a of the first module 300a and the MFS 401b of the second module 300b may form a substantially continuous or flat surface, and may be collectively referred to herein as the MFS 401. Because the first and second modules 300a, 300b are joined along the seam, the tape head 600 has only two skiving edges, a first skiving edge 655a disposed on the first substrate 304a, or the outer edge of the MFS 401a, and a second skiving edge 655b disposed on the second substrate 304b, or the outer edge of the MFS 401b.

A via 650 is formed along a portion of the seam 656. Details of the via 650 are further described below in FIGS. 7A-8B. The via 650 may be considered a channel, bevel, or chamfer. As shown in the MFS view of FIG. 6B, the via 650 has a length 686 less than a width 668 of the first and second substrates 304a, 304b and/or first and second closures 302a, 302b in the z-direction, and equal to or greater than a width 684 or span length of the first and second rows 662, 664 of first and second data heads 601a, 601b in the z-direction. The length 686 of the via 650 is less than or equal to about 500 µm greater than the width 684 of the first row 662 of first data heads 601a or the second row 664 of second data heads 601b.

The length 686 of the via 650 being less than a width 668 of the first and second substrates 304a, 304b and/or first and second closures 302a, 302b in the z-direction, and being equal to or greater than a width 684 or span length of the first and second rows 662, 664 of first and second data heads 601a, 601b in the z-direction, create a vacuum effect to pull a magnetic media or tape 444 against the MFS 401 when the tape head 600 reads and writes data to the magnetic media or tape 444. The length 686 of the via 650 prevents air from getting between the MFS 401 and a tape 444, allowing the tape 444 to be flush with the MFS 401 of the tape head 600 regardless of which direction the tape 444 moves over the tape head 600.

When writing data to and reading data from the tape 444, the tape is spaced a first distance 663a of about 200 µm or greater from a first end (e.g., the top) of the first and second tape heads 300a, 300b, and is spaced a second distance 663b of about 200 µm or greater from a second end (e.g., the bottom) of the first and second tape heads 300a, 300b. The first and second distances 663a, 663b are illustrated for exemplary purposes, and the tape 444 may have a greater width than the width 668 of the first and second tape heads 300a, 300b. Thus, the tape 444 may extend beyond at least one end of the tape heads 300a, 300b, and the first and second distances 663a, 663b are intended only to represent a minimum distance between the tape 444 and each end of the via 650 that enables the via to create the vacuum effect. In other words, the tape 444 will not be disposed at the both the first and second distances 663a, 663b simultaneously.

Furthermore, as shown in the cross-section view of FIG. 6C, even if the first and second modules 300a, 300b are offset a small distance in the y-direction, such as less than 5 µm, the length 686 of the via 650 is still able to create the vacuum effect and prevent air from getting between the MFS 401 and the tape 444. The via 650 widens the range of low clearance offset (e.g., in the y-direction) between the first and second modules 300a, 300b. Thus, transversal clearance distribution remains substantially uniform across the tape 444. The via 650 introduces a large enough spacing gap between the first and second modules 300a, 300b that the pressure is near ambient when a tape 444 moves over the tape head 600. Due to the vacuum effect created by the via 650, the first and second modules 300a, 300b are able to be joined together at the seam 656, and the width 307 of the first and second write heads 306a, 306b may be reduced to about 5 µm to about 10 µm in the x-direction compared to conventional write heads.

FIGS. 7A-7B illustrate MFS views of the via 650 of the tape head 600 of FIGS. 6A-6C, according to various embodiments. In each of the embodiments shown in FIGS. 7A-7B, the via 650 of the tape head 600 has width 766 in the x-direction of about 40 µm to about 250 µm, such as about 80 µm. In FIG. 7A, the via 650 has a substantially elongated hexagonal shape, or six total sides or surfaces, when viewed from the MFS 401. In such an embodiment, the sides or surfaces of the via 650 disposed parallel to the seam 656 are substantially straight. In FIG. 7B, the via 650 has a substantially rectangular shape when viewed from the MFS 401. While FIGS. 7A-7B illustrate two exemplary shapes that the via 650 may be, the via may have another shape. For example, the via 650 may have a substantially octagonal shape, or eight total sides or surfaces, or a substantially oval shape.

Figure 8A:
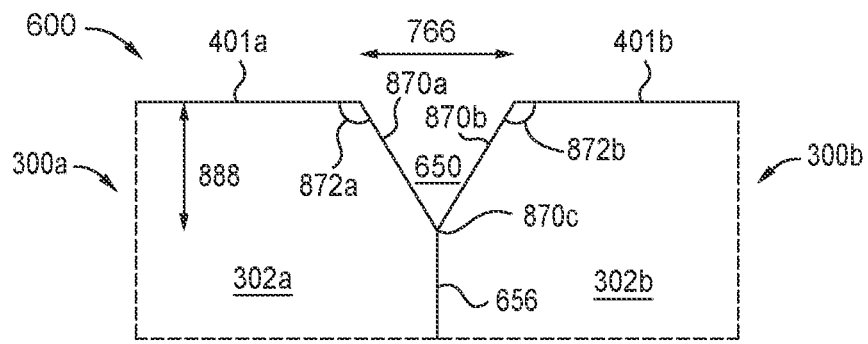
FIGS. 8A-8B illustrate cross-sectional views of the via of the tape head of FIGS. 6A-6C, according to various embodiments.
Figure 8B:
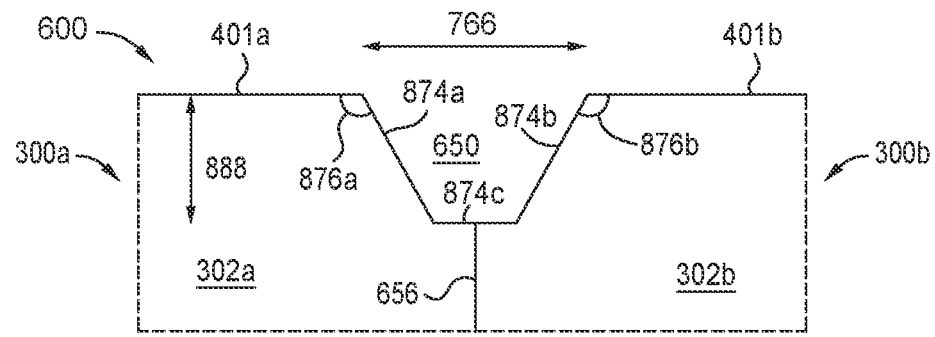

FIGS. 8A-8B illustrate cross-sectional views of the via 650 of the tape head 600 of FIGS. 6A-6C, according to various embodiments. In each of the embodiments shown in FIGS. 8A-8B, the via 650 has a depth 888 in the y-direction of about 0.2 µm to about 5.0 µm, such as about 0.5 µm.

In the embodiment shown in FIG. 8A, the via 650 comprises a first surface 870a extending from the MFS 401a or first closure 302a of the first module 300a to a lowest point 870c of the via 650, and a second surface 870b extending from the MFS 401b or second closure 302b of the second module 300b to the lowest point 870c of the via 650. The lowest point 870c is the location where the first surface 870a meets the second surface 870b. The first surface 870a is disposed at a first angle 872a with respect to the MFS 401a, and the second surface 870b is disposed at a second angle 872b with respect to the MFS 401b. The first angle 872a and the second angle 872b may each individually be between about 30 degrees to about 85 degrees. In some embodiments, the first angle 872a and the second angle 872b are the same.

In the embodiment shown in FIG. 8B, the via 650 comprises a first surface 874a extending from the MFS 401a or first closure 302a of the first module 300a to a lowest surface 874c of the via 650, and a second surface 874b extending from the MFS 401b or second closure 302b of the second module 300b to the lowest surface 874c of the via 650. The lowest surface 874c of the via 650 is the bottom of the via 650, and may be substantially parallel to each MFS 401a, 401b. The first surface 874a is disposed at a first angle 876a with respect to the MFS 401a, and the second surface 874b is disposed at a second angle 876b with respect to the MFS 401b. The first angle 876a and the second angle 876b may each individually be between about 90 degrees to about 175 degrees. In some embodiments, the first angle 876a and the second angle 876b are the same.

Therefore, by including a via along a portion of the seam where a first module and a second module of a tape head are joined together along a seam, the via having a length less than a width of the MFS of each module and equal to or greater than the row of data heads of each module, a vacuum effect is created to pull a magnetic media or tape against the MFS of the tape head when the tape head reads and writes data to the magnetic media or tape. The length of the via being greater than the row of data heads and less than the width of the MFS prevents air from getting between the MFS of the tape head and a tape, allowing the tape to be flush with the MFS of the tape head regardless of which direction the tape moves over the head. Moreover, by joining the first and second modules of the tape head, the data heads of the first module are only disposed a distance of about 50 µm to about 175 µm from the data heads of the second module, which enables the width of the write heads or write transducers of the tape head to be reduced. As such, the modules are spaced far enough apart that the tape head is capable of compensating to TDS effects without suffering a loss of capacity.

In one embodiment, a tape head comprises a first module comprising: a first closure and a plurality of first data heads and one or more first servo heads aligned in a first row at a media facing surface adjacent to the first closure, and a second module comprising: a second closure and a plurality of second data heads and one or more second servo heads aligned in a second row at the media facing surface adjacent to the second closure, the second row being parallel to and aligned with the first row. The first closure and the second closure are joined together along a seam, the seam being parallel to the first and second rows, and a via is disposed along a portion of the seam, the via having a length greater than or equal to a length of the first row.

The via has a depth of about 0.2 µm to about 5.0 µm. The via has a width of about 40 µm to about 250 µm. The first row and the second row are spaced apart a distance of about 50 µm to about 175 µm. The via has a substantially rectangular shape. The via has a substantially hexagonal shape. The length of the via is less than a length of the seam. A tape drive comprises the tape head.

In another embodiment, a tape head comprises a first module comprising: a first closure and a plurality of first data heads and one or more first servo heads aligned in a first row at a media facing surface adjacent to the first closure, and a second module comprising: a second closure and a plurality of second data heads and one or more second servo heads aligned in a second row at the media facing surface adjacent to the second closure, the second row being parallel to and aligned with the first row, wherein the first closure and the second closure are joined together along a seam, the seam being disposed between and parallel to the first and second rows. The tape head further comprises a via disposed along a portion of the seam, the via having a length less than a length of the seam, wherein the via is configured to create a vacuum effect to pull a magnetic media against the media facing surface when the tape head reads and writes data to the magnetic media.

The via has a depth of about 3 µm to about 8 µm and a width of about 3 µm to about 8 µm. The first row and the second row are spaced apart a distance of about 50 µm to about 175 µm. The length of the via is greater than or equal to a length of the first row, and wherein the length of the via is less than or equal to about 200 µm greater than the length of the first row. The via has a substantially rectangular shape or a substantially hexagonal shape. The first closure forms a first surface of the via and the second closure forms a second surface of the via. The first surface and the second surface of the via are substantially perpendicular to the media facing surface. The first surface and the second surface of the via are each individually disposed at an angle of about 15 degrees to about 85 degrees with respect to the media facing surface. A tape drive comprises the tape head.

In yet another embodiment, a tape head comprises a first module comprising: a first closure and a first row of first data heads disposed at a media facing surface adjacent to the first closure, the first row of first data heads comprising a plurality of first write heads, a plurality of first read heads, and one or more first servo heads, and a second module comprising: a second closure and a second row of second data heads disposed at the media facing surface adjacent to the second closure, the second row of second data heads comprising a plurality of second write heads, a plurality of second read heads, and one or more second servo heads, the second row being parallel to and aligned with the first row. The first row and the second row are spaced apart a distance of about 50 µm to about 175 µm, the first closure and the second closure are joined together along a seam, and the seam is disposed between and parallel to the first and second rows. The tape head further comprises a via disposed along a portion of the seam, the via having a length greater than or equal to a length of the first row and less than a length of the seam, wherein the via has a depth of about 0.2 µm to about 5.0 µm and a width of about 40 µm to about 250 µm.

The via is configured to create a vacuum effect to pull a magnetic media against the media facing surface when the tape head reads and writes data to the magnetic media. Each of the plurality of first write heads and each of the plurality of second write heads has a width of about 5 µm to about 10 µm. The first module further comprises a first substrate disposed adjacent to the first row, wherein the second module further comprises a second substrate disposed adjacent to the second row, and wherein when the tape moves over the tape head in a first direction, the first substrate has a first skiving edge at the media facing surface, and when the tape moves over the tape head in a second direction opposite the first direction, the second substrate has a second skiving edge at the media facing surface. The first module is controllable to write data to the magnetic media using the plurality of first write heads and read verify the data using the plurality of first read heads, and wherein the second module is controllable to write data to the magnetic media using the plurality of second write heads and read verify the data using the plurality of second heads. The first module is controllable to write data to the magnetic media using the plurality of first write heads and the second module is controllable to read verify the data using the plurality of second read heads, and wherein the second module is controllable to write data to the magnetic media using the plurality of second write heads and the first module is controllable to read verify the data using the plurality of first heads. A tape drive comprises the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   a first module comprising:
      a first closure; and
      a plurality of first data heads and one or more first servo heads aligned in a first row at a media facing surface adjacent to the first closure; and
   a second module comprising:
      a second closure; and
      a plurality of second data heads and one or more second servo heads aligned in a second row at the media facing surface adjacent to the second closure, the second row being parallel to and aligned with the first row,
   wherein:
      the first closure and the second closure are joined together along a seam, the seam being parallel to the first and second rows,
      a via is disposed along a portion of the seam, the via having a length greater than or equal to a length of the first row, and
      the length of the via is less than a length of the seam.

2. The tape head of claim 1, wherein the via has a depth of about 0.2 μm to about 5.0 μm.

3. The tape head of claim 1, wherein the via has a width of about 40 μm to about 250 μm.

4. The tape head of claim 1, wherein the first row and the second row are spaced apart a distance of about 50 μm to about 175 μm.

5. The tape head of claim 1, wherein the via has a substantially rectangular shape.

6. The tape head of claim 1, wherein the via has a substantially hexagonal shape.

7. A tape drive comprising the tape head of claim 1.

8. The tape head of claim 1, wherein the via is configured to create a vacuum effect to pull a magnetic media against the media facing surface when the tape head writes data to and reads data from a magnetic media.

9. A tape head, comprising:
   a first module comprising:
      a first closure; and
      a plurality of first data heads and one or more first servo heads aligned in a first row at a media facing surface adjacent to the first closure;
   a second module comprising:
      a second closure; and
      a plurality of second data heads and one or more second servo heads aligned in a second row at the media facing surface adjacent to the second closure, the second row being parallel to and aligned with the first row, wherein the first closure and the second closure are joined together along a seam, the seam being disposed between and parallel to the first and second rows; and
   a via disposed along a portion of the seam, the via having a length less than a length of the seam, wherein the via is configured to create a vacuum effect to pull a magnetic media against the media facing surface when the tape head reads and writes data to the magnetic media.

10. The tape head of claim 9, wherein the via has a depth of about 0.2 μm to about 5.0 μm and a width of about 40 μm to about 250 μm.

11. The tape head of claim 9, wherein the length of the via is greater than or equal to a length of the first row, and wherein the length of the via is less than or equal to about 200 μm greater than the length of the first row.

12. The tape head of claim 9, wherein the via has a substantially rectangular shape or a substantially hexagonal shape, and wherein the first row and the second row are spaced apart a distance of about 50 μm to about 175 μm.

13. The tape head of claim 9, wherein the first closure forms a first surface of the via and the second closure forms a second surface of the via.

14. The tape head of claim 13, wherein the first surface and the second surface of the via are substantially perpendicular to the media facing surface.

15. The tape head of claim 13, wherein the first surface and the second surface of the via are each individually disposed at an angle of about 15 degrees to about 85 degrees with respect to the media facing surface.

16. A tape drive comprising the tape head of claim 9.

17. A tape head, comprising:
   a first module comprising:
      a first closure; and
      a first row of first data heads disposed at a media facing surface adjacent to the first closure, the first row of first data heads comprising a plurality of first write heads, a plurality of first read heads, and one or more first servo heads;
   a second module comprising:
      a second closure; and
      a second row of second data heads disposed at the media facing surface adjacent to the second closure, the second row of second data heads comprising a plurality of second write heads, a plurality of second read heads, and one or more second servo heads, the second row being parallel to and aligned with the first row, wherein:
         the first row and the second row are spaced apart a distance of about 50 μm to about 175 μm,
         the first closure and the second closure are joined together along a seam, and
         the seam is disposed between and parallel to the first and second rows; and
      a via disposed along a portion of the seam, the via having a length greater than or equal to a length of the first row and less than a length of the seam, wherein the via has a depth of about 0.2 μm to about 5.0 μm and a width of about 40 μm to about 250 μm.

18. The tape head of claim 17, wherein the via is configured to create a vacuum effect to pull a magnetic media against the media facing surface when the tape head reads and writes data to the magnetic media.

19. The tape head of claim 17, wherein each of the plurality of first write heads and each of the plurality of second write heads has a width of about 5 μm to about 10 μm.

20. The tape drive of claim 17, wherein the first module further comprises a first substrate disposed adjacent to the first row, wherein the second module further comprises a second substrate disposed adjacent to the second row, and wherein when a tape moves over the tape head in a first direction, the first substrate has a first skiving edge at the media facing surface, and when the tape moves over the tape head in a second direction opposite the first direction, the second substrate has a second skiving edge at the media facing surface.

21. The tape drive of claim 17, wherein the first module is controllable to write data to a magnetic media using the plurality of first write heads and read verify the data using the plurality of first read heads, and wherein the second module is controllable to write data to the magnetic media using the plurality of second write heads and read verify the data using the plurality of second read heads.

22. The tape drive of claim 17, wherein the first module is controllable to write data to a magnetic media using the plurality of first write heads and the second module is controllable to read verify the data using the plurality of second read heads, and wherein the second module is controllable to write data to the magnetic media using the plurality of second write heads and the first module is controllable to read verify the data using the plurality of first read heads.

23. A tape drive comprising the tape head of claim 17.

* * * * *